(12) United States Patent
Hiremath et al.

(10) Patent No.: US 7,190,717 B2
(45) Date of Patent: Mar. 13, 2007

(54) SYSTEM AND METHOD FOR TONE ORDERING IN DISCRETE MULTI-TONE (DMT) MODEMS

(75) Inventors: Channamallesh G. Hiremath, Plano, TX (US); Udayan Dasgupta, Irving, TX (US); Zigang Yang, Plano, TX (US); Umashanker S. Iyer, Plano, TX (US); Michael E. Locke, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/233,452

(22) Filed: Sep. 22, 2005

(65) Prior Publication Data

US 2006/0062289 A1    Mar. 23, 2006

Related U.S. Application Data

(60) Provisional application No. 60/612,495, filed on Sep. 22, 2004.

(51) Int. Cl.
    *H04L 5/16* (2006.01)
(52) U.S. Cl. ............... 375/222; 375/316; 375/341; 375/365; 375/260

(58) Field of Classification Search ......... 375/222, 375/259, 264, 316, 341, 365
See application file for complete search history.

(56) References Cited

U.S. PATENT DOCUMENTS

2001/0031011 A1 *  10/2001  Betts .................. 375/259
2001/0031017 A1 *  10/2001  Betts .................. 375/265
2002/0097791 A1    7/2002  Hansen

* cited by examiner

*Primary Examiner*—Mohammed Ghayour
*Assistant Examiner*—Leila Malek
(74) *Attorney, Agent, or Firm*—Steven A. Shaw; W. James Brady; Frederick J. Telecky, Jr.

(57) ABSTRACT

A system and method for reordering tones of a DMT signal within a communication system is described. Cross tone correlated noise in a received signal is identified and rearranged such that tones with correlated noise are spread out throughout the received signal before being processed by a decoder such as, Viterbi decoder. In an embodiment, two tones with the most correlated noise are placed at each end of the sequence of tones presented to the Viterbi decoder. In some embodiment, the tones with correlated noise can be spread such that two adjacent tones with correlated noise have a minimum distance of at least three tones between them at the input to the Viterbi decoder. In other embodiment, tones in the received signal can be processed in various kinds of interleavers for reordering according to the interleaver scheme.

9 Claims, 4 Drawing Sheets

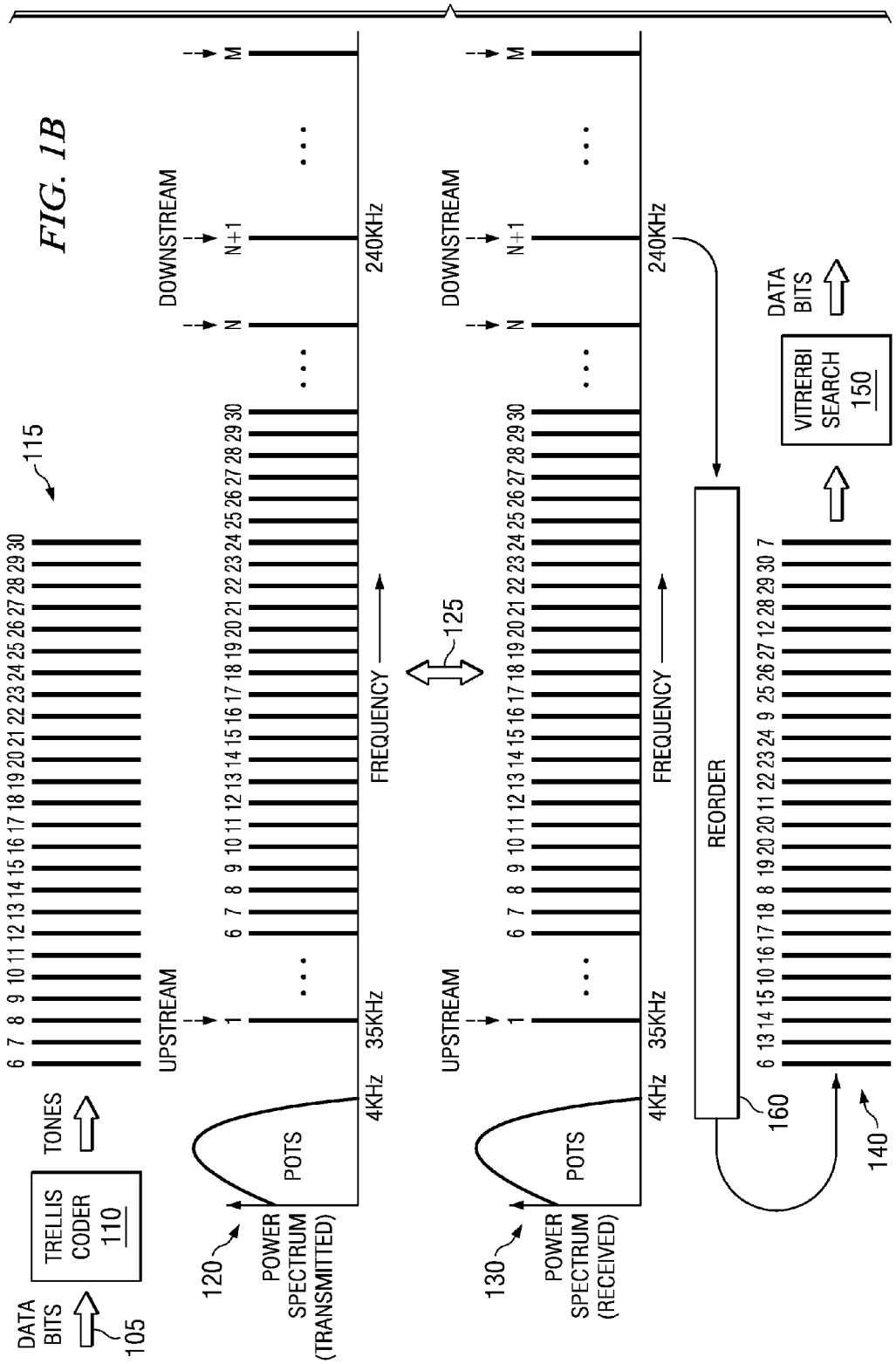

SYSTEM AND METHOD FOR TONE ORDERING IN DISCRETE MULTI-TONE (DMT) MODEMS

PRIORITY CLAIM

This application is non-provisional of and claims priority from U.S. Provisional Patent Application Ser. No. 60/612,495 filed on Sep. 22, 2004 and assigned to the assignee of the present application.

BACKGROUND

1. Field of the Invention

The invention relates to Discrete Multi-Tone (DMT) modems, and in particular, tone ordering in DMT modems.

2. Description of the Related Art

Generally, when DMT signals are transmitted over a communication channel they are impaired by various types of noise. DMT signals are coded before the transmission and decoded at a receiver to reduce the error rate of the recovery of the transmitted information. The coding is implemented as a Forward Error Correction (FEC) scheme that adds redundant information to DMT signals to allow the receiver to eliminate unlikely sequences of data. Often, DMT signals transmitted over a communication channel are impaired by cross-tone correlated noise (hereafter, referred to as correlated noise) such as Inter-Symbol Interference (ISI), echo, AM radio, and crosstalk from other devices functioning in the vicinity of the modem and similar narrow band noise sources. The performance of DMT modems is reduced by the correlated noise. This performance loss results in lower data rate or higher bit error rate for DMT modems.

Often, convolutional encoding combined with Viterbi decoding is used as an FEC scheme in various DMT communication systems. This FEC scheme improves the channel capacity and data rate; however, it does not perform well when there is correlated noise in the received signal. The effect of the correlated noise on the Viterbi decoding method can be minimized by reordering tones of the DMT signal. The ADSL standard ITU-T Rec. G.992.3 recommends receiver determined tone-reordering. However, the recommendation does not suggest any particular scheme for tone-reordering. One use for the receiver determined tone-reordering is to spread out the correlated noise within the spectrum of the received signal to get a better coding gain from the Viterbi decoder. For N tones in a received signal, there can be N! (N factorial) possible tone orderings; however, not every tone ordering can provide optimal performance of Viterbi coding. Therefore, a system and method is needed to provide an optimal tone-reordering scheme for DMT modems for an optimal Viterbi coding gain.

SUMMARY

The present application describes a system and method for reordering tones of a DMT signal within a communication system. In one embodiment, the method identifies correlated noise in a received signal and rearranges tones in the signal such that correlated tones are spread out throughout the spectrum of the received signal before being processed by a decoder such as, Viterbi decoder. The two most correlated tones are placed at each end of the spectrum and remaining tones can be re-ordered such that two adjacent correlated tones have a minimum distance of at least four to five tones between them. In other embodiment, the received signal can be processed in various kinds of interleavers so that tones can be ordered according to the interleaver scheme. In yet another embodiment, tones can be reorder randomly. The interleaving method is preferred for "normal" correlated noise so that there is no need to identify the tones with correlated noise, while the random method can be used when the noise is correlated between non-adjacent tones.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

DESCRIPTION OF THE DRAWINGS

FIG. 1B illustrates an exemplary reordering of tones according to an embodiment;

DESCRIPTION OF THE PREFERRED EMBODIMENT(S)

Figure 1A:
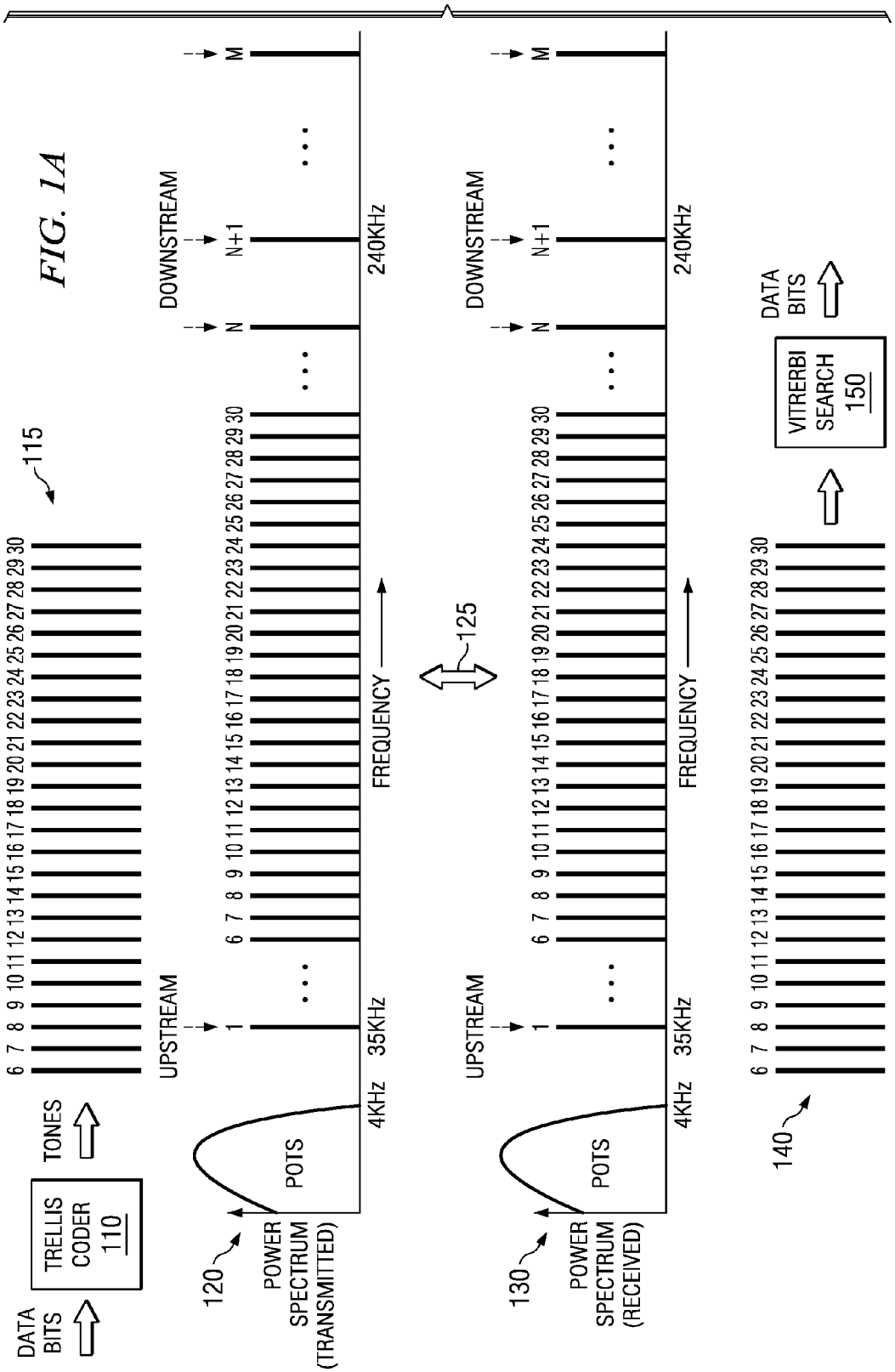
FIG. 1A illustrates an example of tone distribution for a communication channel according to an embodiment.

The re-ordering of tones with correlated noise can be determined as follows: Let x(n) be a sequence of transmitted symbols. After transmission through a communication channel and processing by a modem a sequence of received symbols x'(n) is generated. The noise ns(n) on the signal is given as $$ns(n)=x'(n)-x(n).$$

The noise is said to be correlated if $$E(ns(n)*ns(m))!=0$$

For any m such that n!=m. E( ) is the expected value operator, as defined for mathematical statistics where 'm' and 'n' are integers.

For 4-D trellis code as used in DMT-ADSL and DMT-VDSL, x(n) and ns(n) are 4 dimensional. The theory of trellis codes requires the noise to be uncorrelated to get the best performance from Viterbi search in a trellis decoder. As long as $$E(ns(n)*ns(m))\sim=0$$

When n!=m and abs(n−m)<Z, the Viterbi search achieves most of the performance associated with uncorrelated noise. Larger values of Z give better performance. The value Z>=3 works fairly well with Wei's 4-D code.

When this concept is applied to an FDM modem with block terminated Trellis code such as DMT-ADSL or DMT-VDSL modems, the range of 'n' is limited to the set of tones, that is 0<n<N. Once a finite size set of symbols of interest is obtained, the set can be reorder as desired to improve the performance of Viterbi decoders. An example of the performance improvement is as follows:

Let P(n) be a permutation of {1 . . . N−1} and let P'(n) be the inverse permutation. By definition P'(P(n))=n Tone ordering means that symbols are transmitted as y(n) =x(P(n)) and received as x'(n)=y'(P'(n)). Although the order of tone transmission has been altered, the noise characteristic of the transmission remains the same. That is, for the tone ordered system y'(n)=ns(n)+y(n). However, x'(n) is the input to the Viterbi search of the Viterbi decoder, so the noise at the input to the Viterbi search has been permuted as:

x'(n)=ns(P'(n))+y(P'(n))=ns(P'(n))+x(n).

Now the noise correlation at the input to the Viterbi search has become:

E(ns(P'(n))*ns(P'(m))).

The noise correlation matrix for a modem may be estimated by making measurements on the received signal, or it may be predicted from known characteristics of the transmission channel. For example, DMT-ADSL systems typically exhibit noise correlation between tones that are near a narrow band noise source such as radio frequency interference or the residual of the echo of the locally transmitted signal. Typically, significant correlation is seen across 8–10 tones (4–5 4D points). Thus, if the permutation is designed such that:

abs(P'(n)−P'(m))>=3 for abs(n−m)<5 (n!=m).

We see a significant performance improvement in the Viterbi search performance for DMT-ADSL modems.

Generally, each 4-D symbol is transmitted as 2 independent 2-D tones in a DMT-ADSL system. Although correlation between noises on these tone pairs does not affect the Viterbi search it does affect the co-set selection (slicer) operation that is required before the tones are passed to the Viterbi search. Such correlation degrades the performance of the slicer. Thus, it is advantageous to reorder the tones (rather than just 4-D tone pairs as noted above) such that tones with noise correlation do not appear near each other in the slicer/Viterbi decoder input. Preferably, the 4 individual dimensions of each Viterbi symbol in the block would be reordered. For DMT-ADSL system, T(n) and T'(n) are the tone ordering and inverse tone ordering tables respectively. It is preferred that abs(T'(n)−T'(m))>=6 for abs(n−m)<10 (n!=m).

Where n and m are tone indices rather than 4-D symbol indices. Values larger than 6 or 10 are advantageous.

According to an embodiment, when the number of active tones $N_{act}$ is relatively smaller in a signal, then a minimum distance between the four tones with the most correlated noise can be ensured by determining M+1 correlated tones in the signal where M=($N_{act}$−1)/4. The M+1 tones with correlated noise then can be ordered such that tones with the most correlated noise are the farthest apart i.e. two tones with the highest noise correlation on the ends, next most correlated in the center and remaining tones can be ordered as described above.

FIG. 1A illustrates an example of tone distribution for a communication channel. Typically, data to be transmitted is processed by a Trellis Coder 110 and is modulated on sub-channels (tones) 115 and transmitted over transmission channel 125. The spectrum 120 is the power spectrum transmitted by a transmitter that includes the trellis coder 110. Generally, the lower end of the frequency band is reserved for voice band communication of Plain Old Telephone System (POTS). Data is communicated using higher frequencies typically above 25 kHz. Higher frequencies are divided into many sub-channels (tones). Data symbols are modulated onto each tone and transmitted over the communication channel. The lower portion of the high-frequency band, tones 1–N, is used for upstream (user-to-server) communication and the higher portion, tones N+1–M, is used for downstream (server-to-user) communication. Generally, more tones are reserved for downstream communication than upstream communication, providing higher downstream data communication rate.

In the present example, 25 upstream communication tones (tones 6–30) are active (i.e. carrying data symbols). Trellis coder output is mapped to tones in linear order as follows:

6,7,8,9,10,11,12,13,14,15,16,17,18,19,20,21,22,23,24, 25,26,27,28,29,30

When the power spectrum is transmitted over the channel 125, it suffers from various noise in and around the channel. The power spectrum 130 represents typical spectrum received by a receiver. Typically, the noise on tones 6, 7, 8, and 9 is heavily correlated i.e., these tones cause a large degradation in the Viterbi search performance. The noise on tones 10, 11 and 12 is less strongly correlated and the rest of the tones experience low noise correlation. If tone sequence 140 is input to the Viterbi search 150, then the performance of the Viterbi search 150 can severely degrade. The idea is to create a tone ordering table such that the tones with heavily correlated noise i.e., tones 6–9, are as widely spaced as possible and a minimum of six tones apart. Further adjust the table such that two tones with most correlated noise are assigned as close as possible to the beginning or ending of the tone order (i.e. as far apart as possible).

FIG. 1B illustrates an exemplary reordering of tones according to an embodiment. Tones are reordered using a reorder scheme 160 such that tones with heavily correlated noise are spread throughout the spectrum of active tones. The tone order in the current example is as follows:

6,13,14,15,10,16,17,18,8,19,20,21,11,22,23,24,9,25, 26,27,12,28,29,30,7

The heavily correlated tones 6–9 are as widely spread as possible, improving the performance of the decoder and resulting in reduced upstream error rate. Thus, once tones with heavily correlated noise are identified in an incoming signal, tones can be reordered to space correlated tones as far apart as possible before processing the incoming signal in a decoder. In one embodiment, tones are identified according to the level of noise correlation measured between each sub-channel and two tones with the highest noise correlation are placed on each end of the frequency band. The tone with the $3^{rd}$ greatest correlated noise is placed on the center of the band and remaining tones with correlated noise are placed such that there is a distance of at least three to four tones between each such tone.

Tones that do not have correlated noise can be placed linearly in the band. In the example of FIG. 1B, tones 6 and 7 have heavily correlated noise so they are placed on each end. Tones 8 and 9 are placed with the next priority and far apart from each other and tones 6 and 7 as possible. The rest of the tones with correlated noise, 10–12, are placed at the maximum available distance and the remaining tones, 13–30 are linearly placed in the band. In the present example, the tone reordering is described using upstream tones; however, one skilled in the art will appreciate that the concept is equally applicable to downstream tones. This method can be used when there are not enough total tones to be able to space all adjacent tones away from each other. Typically, correlated noise appears on adjacent tones.

For the purpose of illustration, in the present example, a minimum distance of four tones is used before linear placement is started; however, one skilled in the art can use any distance between adjacent tones with correlated noise to achieve a desired decoder performance based on various factors such as, channel condition, number of active tones, number of tones with correlated noise, and the like. Additionally for the purpose of illustration in the present example, groups of 2, 2, and 3 tones with correlated noise were placed in the ordering table; however, one skilled in the art will appreciate that any number of groups or tones in each group can be used that results in a meaningful spacing between tones with correlated noise. In practice, placing the tones with abs(noise correlation) priority into the tone ordering table at maximum distance apart works well. This can be enhanced by quantizing abs(noise correlation) into groups with a range of a factor of 2 in abs(noise correlation) and placing those with equal priority (i.e. equal spacing). Following pseudo code reflects this scheme.

find start_cor=max(abs(noise_cor))
while (more tones to order)
group=tones with start_cor >=max(abs(noise_cor))>start_cor/2
place group in tone order list with maximum available spacing
start_cor=start_cor/2
end The tone reorder scheme 160 can be implemented using software implementation on various processors for example, a digital signal processor and the like. For ADSL upstream communication, the maximum available spacing between correlated tones degrades to 1 after only 3 or 4 iterations. For ADSL downstream communication, the tone interleaving method is preferred as it is much simpler to implement and faster to compute.

Figure 1C:
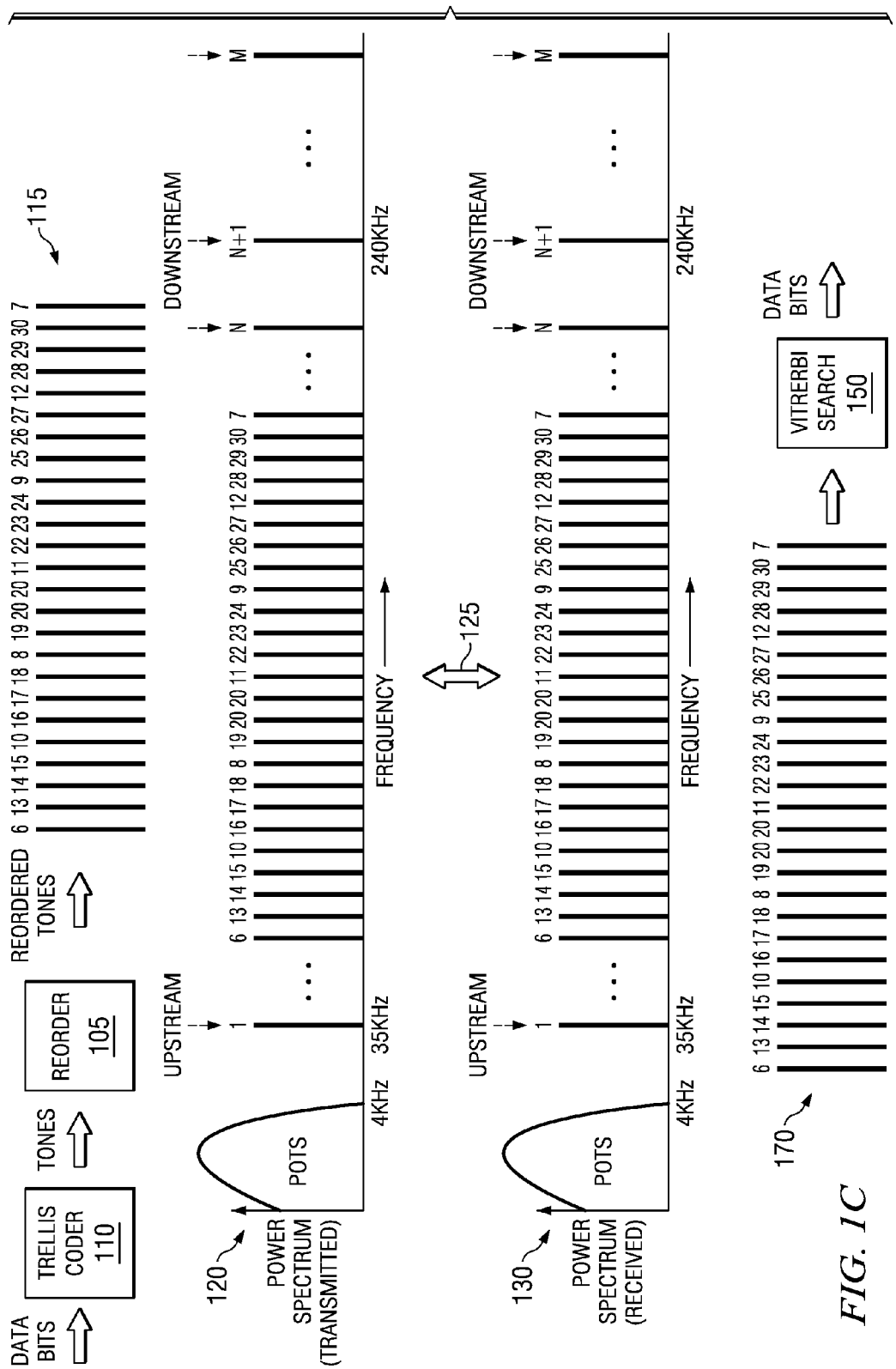
FIG. 1C illustrates an exemplary implementation of tone ordering.

FIG. 1C illustrates an exemplary implementation of tone ordering. After determining a suitable tone order for example, the one illustrated in FIG. 1B, the receiver communicates the reorder to the transmitter and the transmitter then uses the reorder communicated by the receiver. In the present example, after modulating data on tones, the transmitter reorders tones using a reorder scheme 105 and reorders tones as suggested by the receiver. The tone order 115 is then transmitted via the channel 125 to the receiver. The receiver then uses the reordered tones to perform Viterbi search. For purposes of illustration, a single reorder scheme is described, however, one skilled in the art will appreciate that tone ordering can be performed on an ongoing basis by continuously monitoring the performance of the channel 125 and dynamically updating the tone order as desired for an optimal performance.

In another embodiment, tones can be processed in an interleaver (e.g., a block interleaver) to reorder tones according to the interleaving scheme. The size of the interleaver can be chosen such to ensure a minimum distance between two adjacent tones in the received signal. For example, if the number of tones in the received signal is P, then a block interleaver of depth floor($\sqrt{P}$) can be employed to ensure a minimum distance of floor($\sqrt{P}$) between two adjacent correlated tones. The interleaving tone ordering scheme can be adapted to infinite length symbol sequences (convolutional interleaving), such as those used in single carrier modems. For DMT, a convolutional interleaver dynamically changes the tone order.

An interleaving scheme according to an embodiment is given as follows: To interleave N tones, $Q=\lfloor\sqrt{N}\rfloor$ $R=\lfloor N/Q \rfloor$ $S=[(R+1)*Q]-N$ The objective is to define an interleaver with Q-S rows that are R+1 in length followed by S rows that are R in length. This can be expressed in pseudo code as follows:

```
startrow = 0;
n = 0;
for (j=0;j<Q-S;j++)
        for (i=0;i<R+1;i++)
                T(n++) = startrow+i*Q
                startrow++;
for (j=0;j<S;j++)
    for (i=0;i<R;i++)
        T(n++) = startrow+i*Q
    startrow++
```

The mathematical expression can be represented as follows:

$T(n)=\lfloor n/(R+1) \rfloor+((n \bmod (R+1))*Q \bmod N)$ for $n=0$ . . . $((R+1)*(Q-S))$         Eq. 1

$T(n)=Q-S+\lfloor m/R \rfloor+((m \bmod R)*Q \bmod N)$ for $n=(R+1)*(Q-S)$ . . . $N-1$         Eq. 2

Where m=n−(R+1)*(Q−S). Note that both equations produce Q−S for the n=(R+1)*(Q−S) term.

Interleaved tone ordering is suitable when there are a fairly large number of tones. This works well if N>100.

A convolutional interleaver can be used between a trellis coder and IFFT in the DMT system with I=N, and D>=6 where I is the block length of the convolutional interleaver, D is the depth of the convolutional interleaver, and N is the number of tones and I & D are mutually prime (i.e., they have no common factors>1). In case of a convolutional interleaver, the interleaved output sequence for an input x(n) with block length I and depth D is given as:

$y((n \bmod I)*D+I*\text{floor}(n/I))=x(n)$

Thus, every Ith point of x( ) is transmitted without delay, the next sample is transmitted with a delay of D−1, the next sample is transmitted with a delay of 2*(D−1) etc. This works well if I and D are mutually prime (have no common factors>1); otherwise multiple x( ) values will map to a single y( ) value. A de-interleaver reverses this process.

In an embodiment, when the location of tones with correlated noise cannot be determined, the tones can be reordered randomly. The random reordering of tones can simplify reorder processing; however, the data rate can be degraded because there is a possibility that random ordering may place tones with correlated noise at a distance of less than six tones from each other, which may negatively affect the performance of the decoder. In random tone ordering, T(n) is set to random values with an assumption that after re-ordering tones with correlated noise do not appear near each other. Random tone ordering can be applied in situations where the noise correlation appears between random tone pairs and the noise correlation cannot be measured. Random tone ordering works better when there are a fairly large number of tones so that the probability of tones with correlated noise being placed at a distance of less than six tones is minimized. This works well if N>100.

In one embodiment, the reordering scheme can be selected based on various factors for example the decision to reorder tones can be based on the noise correlation of tones. Depending upon the noise correlation of tones, interleaving or random ordering can be chosen as the reordering scheme. Further, the frequency distribution of tones with correlated noise can also be used to determine the optimal reordering of tones with correlated noise. Similarly, any combination of schemes can be used to reorder tones based on the number of tones with correlated noise, number of tones in the incoming signal, noise correlation of tones, frequency distribution of tones with correlated noise and similar other factors.

Figure 2:
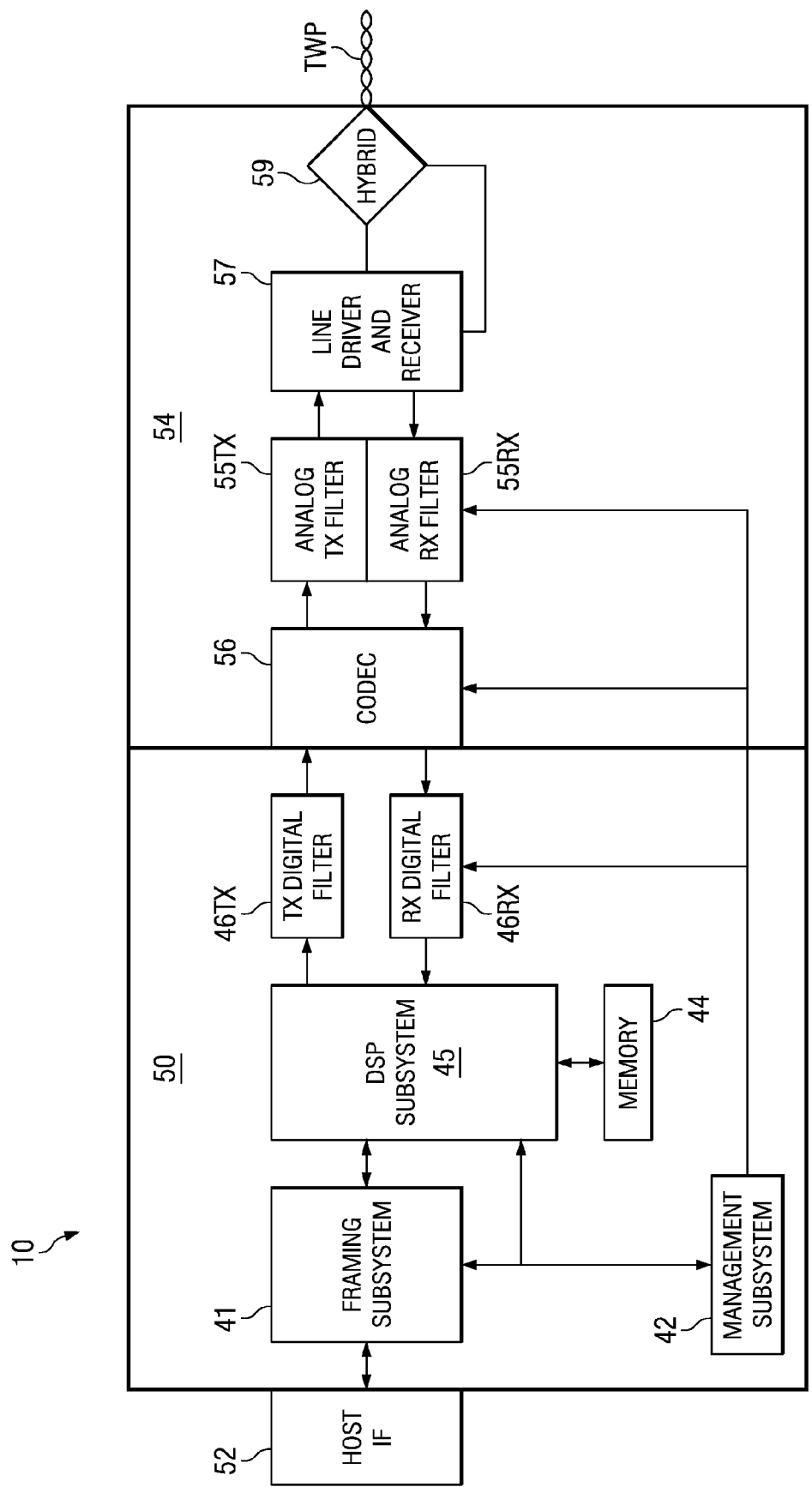
FIG. 2 illustrates an exemplary architecture of modem 10 as may be deployed as client premises equipment (CPE) according to an embodiment of the invention.

FIG. 2 illustrates an exemplary architecture of modem 10 as may be deployed as client premises equipment (CPE) according to an embodiment of the invention. The construction of CPE modem 10 is provided by way of example only, and is meant only to illustrate a possible modem architecture into which the preferred embodiment of the invention may be implemented. Of course, the invention may be implemented into DSL modems of different architectures, and into communications equipment of similar and different architectures for different communications applications.

CPE modem 10 is effectively a transceiver, in the sense that it can both transmit and receive signals over twisted pair facility TWP. According to this preferred embodiment of the invention, CPE modem 10 includes digital transceiver 50, which is coupled to host interface 52 for communicating with the client side host computer, which is typically a personal computer that may be coupled to modem 10 via a router or other network adapter, for example. Considering that CPE modem 10 is intended as CPE, digital transceiver 50 in this example supports one communications port, such as shown in FIG. 2 in which digital transceiver 50 is connected to a single instance of analog front end 54, which in turn couples to twisted-pair wire facility TWP. Alternatively, digital transceiver 50 may support multiple communications ports, for example in a "bonded" DSL environment in which modem 10 receives downstream signals over two separate twisted pair facilities, in which case each port would be realized by an instance of analog front end 54. Analog front end 54 in this example includes hybrid circuit 59, which is a conventional circuit that is connected to transmission loop LP, and that converts the two-wire arrangement of the twisted-pair facility to dedicated transmit and receive lines connected to line driver and receiver 57, considering that bidirectional signals are communicated over facility TWP by CPE modem 10.

Line driver and receiver 57 is a high-speed line driver and receiver for driving and receiving ADSL signals over twisted-pair lines. Line driver and receiver 57 is bidirectionally coupled to coder/decoder ("codec") circuit 56 via analog transmit and receive filters 55TX, 55RX, respectively. Codec 56 in analog front end 54 performs the conventional analog codec operations on the signals being transmitted and received, respectively. These functions include digital and analog filtering, digital-to-analog conversion (transmit side), analog-to-digital conversion (receive side), attenuators, equalizers, and echo cancellation functionality, if desired.

The digital transceiver 50 includes framing subsystem 41, which is coupled to the fiber optic side of transceiver 50, and which formats digital data to be transmitted into frames, or blocks, for modulation and transmission. DSP subsystem 45 of digital transceiver 50 is preferably one or more digital signal processor (DSP) cores, having sufficient computational capacity and complexity to perform much of the digital processing in the encoding and modulation (and demodulation and decoding) of the signals communicated via digital transceiver 50 including reordering of tones as described herein above. In an embodiment, the DSP subsystem includes a Viterbi decoder (not shown) for decoding received signals. The DSP subsystem can also include various types of interleavers. The interleavers can be implemented in the software stored in the memory 44 or individual customized hardware units (ASIC). In the present example, decoders and interleavers are implemented in the software executed by the DSP subsystem 45. Transceiver 50 also includes memory resources 44, including both program and data memory, accessible by DSP subsystem 45 in carrying out its digital functions, for example according to software stored in memory resources 44. These digital functions includes the IDFT modulation (and DFT demodulation of received signals), appending (and removal) of cyclic extensions, among other conventional digital functions.

The digital transceiver 50 also includes transmit and receive digital filters 46TX, 46RX, respectively, for applying the appropriate filter functions to the transmitted and received signals, respectively. Digital filters 46TX, 46RX may be executed by DSP subsystem 45 according to the corresponding software routines, as known in the art, or alternatively may be realized as separate hardware resources. Management subsystem 42 implements and effects various control functions within digital transceiver 50, communicating with each of the major functions of digital transceiver 50 to control its operation according to the desired number of ports to be supported. In addition, the management subsystem 42 issues control lines to receive digital filters 46RX, to receive analog filter 55RX, and to codec 56. The management subsystem 42 can adjust these receive filters and the sampling rate applied by codec 56 to attain improved data rate performance, depending on the particular conditions of the channel.

As mentioned above, the architecture shown in FIG. 2 is presented by way of example only. Alternative architectures for DSL modem communication, and for other multicarrier modulation communication systems such as OFDM wireless communications, are also contemplated to be within the scope of the invention, and may be implemented by those skilled in the art having reference to this specification, without undue experimentation.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of reordering tones in a communication system, said method comprising:

receiving a signal at a receiver from a transmitter, wherein the signal comprising a first plurality of tones in a first order;

determining a second plurality of tones from the first plurality of tones, the second plurality of tones having correlated noise;

determining a second order of tones for the first plurality of tones by interleaving, in a block interleaver of depth floor($\sqrt{P}$), the first plurality of tones when the number of tones in the first plurality of tones exceed a predetermined number of tones, wherein P is number of tones in the first plurality of tones such that each one of the second plurality of tones in the second order is at least two tones apart from each other;

communicating the second order of tones to the transmitter; and transmitting and receiving signals with tones in the second order.

2. A method according to claim 1, wherein each one of the second plurality of tones is at least one of three tones or four tones apart from each other in the second order of tones.

3. A method according to claim 1, wherein the interleaving the first plurality of tones is performed when the first plurality of tones includes at least one hundred tones.

4. A method of reordering tones in a communication system, said method comprising:

receiving a signal at a receiver from a transmitter, wherein the signal comprising a first plurality of tones in a first order;

determining a second plurality of tones from the first plurality of tones, the second plurality of tones having correlated noise;

determining a second order of tones for the first plurality of tones by interleaving, in a block interleaver of depth floor($\sqrt{P}$), the first plurality of tones when the number of tones in the first plurality of tones exceed a predetermined number of tones, wherein the second plurality of tones having correlated noise, wherein P is number of tones in the first plurality of tones;

communicating the second order of tones to the transmitter; and transmitting and receiving signals with tones in the second order.

5. A method according to claim 4, wherein each one of the second plurality of tones is at least one of three tones or four tones apart from each other in the second order of tones.

6. A method according to claim 4, wherein the interleaving the first plurality of tones is performed when the first plurality of tones includes at least one hundred tones.

7. A communication device comprising:

an analog front end configured to receive signals from a transmitter, wherein the signal comprising a first plurality of tones in a first order; and a processing unit coupled to the analog front end and configured to:

determine a second plurality of tones from the first plurality of tones, the second plurality of tones having correlated noise;

determine a second order of tones for the first plurality of tones by interleaving, in a block interleaver of depth floor($\sqrt{P}$), the first plurality of tones when the number of tones in the first plurality of tones exceed a predetermined number of tones, wherein P is number of tones in the first plurality of tones such that each one of the second plurality of tones in the second order is at least two tones apart from each other; and communicate the second order of tones to the transmitter; wherein thereafter the communication device transmits and receives signals with tones in the second order.

8. A communication device according to claim 7, wherein the processing unit is further configured to:

place each one of the second plurality of tones in the second order such that each one of the second plurality of tones in the second order is at least four tones apart from each other.

9. A communication device according to claim 7, wherein interleaving the first plurality of tones is performed when the first plurality of tones includes at least one hundred tones.

* * * * *